(12) United States Patent
Quénon et al.

(10) Patent No.: US 9,376,329 B2
(45) Date of Patent: Jun. 28, 2016

(54) CONTINUOUS FE(III) PRODUCTION AT ATMOSPHERIC PRESSURES

(71) Applicant: Tessenderlo Chemie NV, Brussels (BE)

(72) Inventors: Philippe Quénon, Loos Cedex (FR); Rudy Peeters, Tessenderlo (BE)

(73) Assignee: Tessenderlo Chemie NV, Brussels (BE)

( * ) Notice: Subject to any disclaimer, the term of this patent is extended or adjusted under 35 U.S.C. 154(b) by 103 days.

(21) Appl. No.: 14/285,372

(22) Filed: May 22, 2014

(65) Prior Publication Data

US 2014/0348733 A1 Nov. 27, 2014

(30) Foreign Application Priority Data

May 22, 2013 (EP) ..................................... 13168775
Dec. 5, 2013 (EP) ..................................... 13195781

(51) Int. Cl.

| | | |
|---|---|---|
| *C01G 49/00* | (2006.01) | |
| *C01G 49/06* | (2006.01) | |
| *C01G 49/14* | (2006.01) | |
| *B01F 3/00* | (2006.01) | |
| *B01F 5/02* | (2006.01) | |
| *B01F 5/10* | (2006.01) | |
| *B01D 53/68* | (2006.01) | |
| *B01D 53/78* | (2006.01) | |
| *B01F 3/04* | (2006.01) | |
| *C01G 49/10* | (2006.01) | |
| *C23G 1/36* | (2006.01) | |
| *C23F 1/46* | (2006.01) | |
| *C02F 1/52* | (2006.01) | |

(52) U.S. Cl.

CPC ............... *C01G 49/06* (2013.01); *B01D 53/68* (2013.01); *B01D 53/78* (2013.01); *B01F 3/00* (2013.01); *B01F 3/0451* (2013.01); *B01F 5/0256* (2013.01); *B01F 5/106* (2013.01); *C01G 49/10* (2013.01); *C01G 49/14* (2013.01); *C23G 1/36* (2013.01); *C02F 1/5245* (2013.01); *C23F 1/46* (2013.01)

(58) Field of Classification Search

None
See application file for complete search history.

(56) References Cited

U.S. PATENT DOCUMENTS

| | | | | |
|---|---|---|---|---|
| 1,430,551 | A * | 10/1922 | Herrly | C01G 49/14 423/558 |
| 2,677,598 | A * | 5/1954 | Crummett | B01J 41/00 423/493 |
| 4,563,338 | A | 1/1986 | Seon et al. | |
| 5,489,380 | A | 2/1996 | Gaddis | |
| 2003/0211031 | A1 | 11/2003 | Temyanko | |
| 2010/0061920 | A1 * | 3/2010 | Janak | C01G 49/08 423/493 |

FOREIGN PATENT DOCUMENTS

| | | |
|---|---|---|
| BE | 1011575 A3 | 11/1999 |
| DE | 2166028 A1 | 2/1973 |
| EP | 0968961 A2 | 1/2000 |
| GB | 1183006 A | 3/1970 |
| JP | 2002-001365 | 1/2002 |
| WO | WO 03/084652 A2 | 10/2003 |
| WO | WO 2010/138443 A1 | 12/2010 |

* cited by examiner

*Primary Examiner* — Steven Bos
(74) *Attorney, Agent, or Firm* — Fennemore Craig, P.C.

(57) ABSTRACT

A method oxidizes ferrous iron to ferric iron. The method includes providing a liquid, which includes the ferrous iron, and a gas, which includes an oxidizing agent, such as oxygen and/or chlorine; providing two separate mixes, with both mixes including the gas and the liquid; and colliding the separate mixes, thereby obtaining the ferric iron.

21 Claims, 2 Drawing Sheets

CONTINUOUS FE(III) PRODUCTION AT ATMOSPHERIC PRESSURES

TECHNICAL FIELD

The invention pertains to the technical field of oxidizing ferrous iron Fe(II) to ferric iron Fe(III), in particular to oxidation, chlorination or oxychlorination of ferrous chloride or ferrous sulfate in an aqueous solution.

BACKGROUND

It is well known that in the production of steel, especially strip steel, in order to improve the quality of the surface of the steel, it is subjected to treatment with a solution of hydrochloric acid. This step is called "pickling", and the resultant liquor from this step containing ferrous chloride $FeCl_2$ is called "waste pickle liquor" (WPL). In general, the waste pickle liquor from such a treatment comprises an aqueous solution of about 3-5% HCl and 15-20 weight percent of ferrous chloride. In rare occasions, the WPL may comprise ferrous sulfate $FeSO_4$ in case the pickling is performed using sulfuric acid $H_2SO_4$. Ferrous sulfate may also arise as a byproduct of Ti-production.

Several methods have been proposed for economically treating the pickle liquor in order to dispose of same and/or for converting the liquor to an easily disposable and/or useful product, e.g. ferric chloride ($FeCl_3$). For example, one process involves treating the pickle liquor with chlorine gas in order to convert the ferrous chloride to ferric chloride. However, chlorine gas $Cl_2(g)$ is not always available and requires the presence of a production unit, e.g. an electrolysis unit. If $Cl_2$ would be supplied in liquid phase, then cost, toxicity and safety problems usually arise. Oxygen $O_2$, hydrochloric acid HCl in liquid phase and sulfuric acid $H_2SO_4$ can be made more easily available in large quantities as they are routinely transported.

US application US 2003/211031 discloses a process for producing ferric chloride whereby pickle liquor containing ferrous chloride and fortified with sufficient HCl is converted to ferric chloride in the presence of oxygen in a tower at a temperature above 132° F. The ferric chloride solution from the tower is subjected to evaporation so as to increase the concentration of the ferric chloride. The resultant concentrate is recycled into the tower until a concentration of about 40% by weight ferric chloride is obtained. A gas phase from either or both of the tower and the evaporator is scrubbed in order to remove HCl which can be used to fortify the pickle liquor. Flow rates are 1000-1500 gallons/min.

Japanese application JP 2002-001365 discloses a simple method of recycling an etching waste liquid by defects in the conventional ejector method for recycling iron chloride from etching waste water. A ferrous chloride solution is hereby oxidized by supplying oxygen containing gas using an ejector mechanism, whereby the free hydrochloric acid concentration in the oxidation reaction liquid is maintained at 1 mass % or less, to manufacture a ferric chloride solution. The method disclosed in this application seems to work only at high temperatures and at slow reaction rate.

U.S. Pat. No. 5,489,380 discloses an apparatus and a process for the biological purification of sewage, with which sewage, containing dissolved pollutants, and air are fed together to a reactor via at least two mutually separate nozzles. To achieve a high substance exchange in the reactor, the streams of the two-substance mixture emanating from the nozzles are conducted such that they make impact with each other in the said reactor in an impact zone. The sewage is passed from the reactor into Pa settling tank, in which bio sludge settles. This document does not disclose the possibility of chlorinating or oxychlorinating ferrous iron in a solution to ferric iron. In fact, this document relates to the treatment of sewage with air or pure oxygen and not to the oxidation, chlorination or oxychlorination of ferrous iron. As U.S. Pat. No. 5,489,380 is concerned with purification of sewage, rest gasses which are formed after reacting with the sewage are not re-introduced as reagens into the reactor, but are extracted from the process.

There remains a need in the art for an improved method and system for oxidizing metal ions, in particular for oxidizing ferrous iron Fe(II) to ferric iron Fe(III), which may be operated both in continuous and in batch mode and preferably in continuous mode, with improved reaction rates, at lower temperatures than state of the art techniques and at or near atmospheric pressure, and which has better scalability properties, i.e. wherein the production rate can be increased more efficiently by scaling up the installation than in the case of scaling up prior art techniques.

The present invention thereto aims to provide a method and system with an increased oxidation rate of a metal ion such as ferrous iron to ferric iron as compared to prior art methods and systems, which furthermore comprises improved scalability and versatility in production rate and operation parameters, which is further capable of oxidizing ferrous iron at atmospheric pressure or about atmospheric pressure if desired, and in a continuous way.

An objective of the present invention is not only to provide an improved process for treating pickle liquor, but also to provide a process for the conversion of ferrous iron to ferric iron, and in particular of:
  ferrous chloride to ferric chloride;
  ferrous sulfate to ferric chloro-sulfate; and/or
  ferrous sulfate to ferric sulfate,
irrespective of the source of the ferrous iron. Another object is to provide a system to conduct the process.

SUMMARY OF THE INVENTION

To attain the above mentioned objects, an essential aspect of the present invention comprises a step of mixing the liquid comprising the metal ion, e.g. the ferrous iron, to be oxidized with a gaseous oxidizing agent such as $Cl_2$ or $O_2$, whereby preferably a neutralizing agent, e.g. a chlorine-containing substance such as an aqueous solution of HCl, is added to the liquid prior to the mixing with the gas and/or a neutralizing agent, e.g. gaseous HCl or $Cl_2$, is added to the gas prior to mixing with the liquid. The mixing can be done preferably in one, two or more mixing systems, preferably injection systems. Another essential aspect of the present invention comprises a step of colliding at least two streams comprising such gas-liquid mixtures as obtained by the mixing. The kinetic energy in the collision can be used to increase the rate of the oxidation, chlorination or oxychlorination reaction. Furthermore, the reaction surface, which comprises the total surface of the gas bubbles in the mixture, can be increased as the collision seems to lead to smaller bubbles.

The present invention concerns a method for oxidizing a metal ion to an oxidized metal ion, preferably ferrous iron to ferric iron, comprising the steps of:
  providing a liquid comprising said metal ion, preferably said ferrous iron, and a gas comprising an oxidizing agent, such as oxygen and/or chlorine;
  providing two separate mixes, a first mix and a second mix, both mixes comprising said gas and said liquid; and colliding said separate mixes thereby obtaining the oxidized metal ion, preferably ferric iron.

In an embodiment, said liquid and/or said gas further comprises a neutralizing agent, such as chloride or sulphate in acid form.

In an embodiment, the method can be used for oxidizing a metal ion in a liquid solution, and comprises the steps of:
provide a liquid comprising said metal ion;
providing a gas comprising an oxidizing agent;
providing at least a first mixing system and providing at least a second mixing system, each of said mixing systems arranged to mix said gas with said liquid, thereby obtaining at least a first and at least a second gas-liquid mixture stream;
whereby the method comprises the steps of:
colliding said first gas-liquid mixture stream with said second gas-liquid mixture stream in an impact zone.

Herein:

The substance which comprises the metal ion to be oxidized, is dissolved in a liquid solution, preferably in an aqueous solution. The substance may be $FeCl_2$, $FeSO_4$, etc.

The oxidizing agent is in gaseous form and is capable of oxidizing the metal ion, the agent thereby being reduced. It may comprise $O_2$, $Cl_2$, air or a mixture thereof. The supply of the gas comprising the oxidizing agent may come from an upstream reactor.

The neutralizing agent takes care of salt formation with the oxidized metal ion. The neutralizing agent can be in gaseous or liquid form or both. It supplies the ion which neutralizes the oxidized metal ion, and is preferably an acid. Examples are HCl and $H_2SO_4$. Possibly the neutralizing agent may be diluted with the oxidizing agent, e.g. HCl-gas diluted with air or $O_2$, or may be identical to the oxidizing agent, e.g. in case of $Cl_2$ as oxidizing agent. It is possible that the neutralizing agent is at least partly dissolved in the final product, e.g. a final product being a solution of $FeCl_3$ and HCl.

In an embodiment, the liquid comprises a substance, such as ferrous chloride or ferrous sulphate, which comprises the ferrous iron whereby said ferrous iron is oxidized to ferric iron by reaction with said oxidizing agent and/or neutralizing agent. In a preferred embodiment, the liquid comprises ferrous chloride $FeCl_2$ which is oxychlorinated to ferric chloride $FeCl_3$. In a preferred embodiment, the liquid comprises ferrous sulphate $FeSO_4$ which is oxychlorinated to ferric chlorosulfate $FeClSO_4$. In a preferred embodiment, the liquid comprises ferrous sulphate $FeSO_4$ which is oxidized to ferric sulfate $Fe_2(SO_4)_3$.

In an embodiment, said liquid comprises chloride, whereby said metal ion is oxychlorinated by reaction with said chloride and said oxidizing agent.

In an embodiment, said oxidizing agent comprises gaseous oxygen $O_2$, pure gaseous oxygen $O_2$, gaseous chlorine $Cl_2$, pure gaseous chlorine $Cl_2$, air, air with gaseous $Cl_2$ and/or whereby said liquid or said gas comprises hydrochloric acid and/or sulfuric acid.

In a preferred embodiment, said metal ion is oxychlorinated.

In a more preferred embodiment, said liquid comprises ferrous iron, preferably ferrous chloride, said liquid comprises chloride, preferably hydrochloric acid, and said oxidizing agent comprises oxygen, whereby said ferrous iron is oxychlorinated to ferric chloride by reaction with said chloride and said oxygen.

The present invention also provides a method for oxychlorinating a metal ion in a liquid solution, comprising the steps of:
providing a liquid comprising said metal ion;
providing a gas comprising an oxidizing agent;
providing at least a first mixing system and providing at least a second mixing system, each of said mixing systems arranged to mix said gas with said liquid, thereby obtaining at least a first and at least a second gas-liquid mixture stream,
whereby the method comprises the steps of:
colliding said first gas-liquid mixture stream with said second gas-liquid mixture stream in an impact zone
and whereby said liquid comprises chloride and/or said oxidizing agent comprises chlorine.

In a further aspect, the present invention provides a system for oxidizing a metal ion to an oxidized metal ion, preferably ferrous iron to ferric iron, comprising:
at least a first mixing system comprising an inlet connected to a supply of a liquid which comprises said ferrous iron and an inlet connected to a supply of a gas comprising an oxidizing agent such as oxygen and/or chlorine, said first mixing system arranged for mixing said gas with said liquid into a first mix, and said first mixing system comprising a first outlet for said first mix;
at least a second mixing system comprising an inlet connected to a supply of a liquid which comprises said ferrous iron and an inlet connected to a supply of a gas comprising an oxidizing agent such as oxygen and/or chlorine, said second mixing system arranged for mixing said gas with said liquid into a second mix, and said second mixing system comprising a second outlet for said second mix;
whereby said first and said second outlets are preferably arranged in a facing relationship to each other and preferably whereby said first outlet and said second outlet are in fluid connection with an impact zone.

In an embodiment, said liquid and/or said gas comprises chloride or sulphate in acid form.

In an embodiment, said liquid comprises ferrous chloride or ferrous sulphate, wherein said system is arranged for oxychlorinating said ferrous iron to ferric chloride or ferric chloro-sulphate by reaction with said oxidizing agent and/or a neutralizing agent, or whereby said liquid comprises ferrous sulfate and wherein said system is arranged for oxidizing said ferrous iron to ferric sulfate by reaction with said oxidizing agent and/or a neutralizing agent.

In an embodiment, the impact zone is in fluid connection with a container for holding a reaction fluid comprising a reaction gas, a reaction liquid and a reaction gas-liquid mixture. In a preferred embodiment, said container comprises:
a gas outlet for evacuating at least part of said reaction gas, preferably comprising oxygen and/or chlorine, e.g. under the form of $O_2$, $Cl_2$ or HCl, from said container, said gas outlet in fluid connection with at least one of said mixing systems for supplying the first and/or second mixing system with said gas comprising an oxidizing agent; and/or
a liquid outlet for extracting said reaction liquid and/or a reaction gas-liquid mixture from said container, said liquid outlet in fluid connection with at least one of said mixing systems for supplying the first and/or second mixing system with said liquid comprising ferrous iron and/or with a gas-liquid mixture comprising ferrous iron.

Hereby, either the reaction gas or the reaction liquid and/or gas-liquid mixture, or both the reaction gas and the reaction liquid and/or gas-liquid mixture can be re-used in the mixing systems, e.g. to iterate the reaction steps.

In a preferred embodiment, said system is closed, thereby controlling all gas streams, liquid streams or gas-liquid mixture streams for ensuring that no gas is vented from the system to the atmosphere in an uncontrolled manner and that all liquid or gas-liquid mixture extracted from the system can be re-used or controllably stored and/or transported.

In case the liquid which is being treated is WPL, it can be enriched with HCl so that the resultant liquid contains a sufficient concentration of Cl ions to convert substantially all the $FeCl_2$ to $FeCl_3$, but at the same time, the concentration of HCl should not exceed about 2% by weight in the final product and/or the concentration of Fe(II) should not exceed about 1% by weight in the final product. The fluid product which is reached after the collision step can be collected in a container which is kept to a temperature just below boiling temperature. The pressure in the container can be kept at or near atmospheric pressure. Heat may be externally provided to the container or may come at least partly from the energy available by the exotherm oxychlorination process. If cooling is necessary, this may be done externally or by heat exchange between extracted $FeCl_3$ solution and supplied liquid comprising ferrous chloride and/or HCl.

Treatment of liquid comprising other types of substances e.g. ferrous sulphate, may follow similar steps, i.e. the liquid could be enriched with HCl to increase the $Cl^-$ content and the acidity and/or with $H_2SO_4$ to increase the acidity, and the substance may be e.g.

oxychlorinated to ferric chloro-sulphate by reaction with the oxidizing agent and with the chloride from the hydrochloric acid or the chlorine in the oxidizing agent, and/or oxidized to ferric sulphate by reaction with the oxidizing agent and with the sulphate from the sulfuric acid.

The process of the present invention allows operation at lower temperatures than the prior art techniques and allows operation at or near atmospheric pressure. Optimal temperature for operation at or near atmospheric pressure seems to be lying between 85 and 90° C., at least in the case ferrous chloride is to be oxychlorinated to ferric chloride. Higher temperatures are possible, but could lead to increased degradation of the installation components in view of the acid in the reaction mixture. In an embodiment, the operation is performed at a temperature which depends on the pressure in the container. Preferably this temperature is just below boiling temperature at the pressure in the container. More preferably, the operation is performed at a temperature which is higher than 60%, preferably higher than 65%, more preferably higher than 70%, yet more preferably higher than 75%, and at a temperature which is lower than 100%, preferably lower than 95% of the boiling temperature in degrees centigrade of the liquid at the pressure at which the operation is performed. Lower temperatures are also possible, but seem to lead to suboptimal reaction rates.

The resultant solution comprising ferric iron, e.g. under the form of ferric chloride, can be withdrawn from the container. Concentrations of 40 wt % of ferric chloride can be reached directly, depending on the concentration of the reactants, e.g. of $FeCl_2$ and HCl, or indirectly, e.g. by evaporating water out of the solution in an evaporator and/or by recirculating at least part of the resultant solution to inlets of the mixing systems. Possibly, the concentration of the reactants such as $FeCl_2$ in the begin product may be increased e.g. by evaporating water out of the solution which is to be treated in a method or system of the present invention.

The obtained $FeCl_3$ can then be used, for example, in a sewage or water treatment facility to precipitate solids. Alternatively, it can be further concentrated and purified to recover solid $FeCl_3$ which can be used for the same purpose.

As mentioned, by colliding at least two streams of gas-liquid mixtures coming from at least two injectors, the oxidation rate can be increased considerably compared to prior art oxidation, chlorination or oxychlorination processes due to the increased reaction surface and the additional energy provided to the reactants under the form of kinetic energy. Furthermore, the installation which is required to implement this method can be kept small and has improved scalability properties as compared to prior art installations. The process can further be operated in continuous or in batch mode.

In a preferred embodiment, the resultant solution comprises ferric chloride within 10%, preferably within 5%, most preferably about within 1% of a maximal concentration at which the solution is liquid, this maximal concentration being dependent on a temperature at which the ferric chloride solution is kept. As an example, concentrations of up to 40 wt % at room temperature are possible, but also concentrations of up to 80 wt % of $FeCl_3$ are possible at about 80° C.

A very important result of the process and system as described in this text, is that a high concentration of ferric iron in the end product can be reached directly. As mentioned above, when the liquid comprises ferrous chloride which is to be oxychlorinated to ferric chloride, a solution comprising ferric chloride at a concentration of up to and more than 40 wt % can be reached in the end product.

In a further aspect, the invention concerns the use of a system according to the present invention in a method for oxidizing a metal ion in liquid solution, preferably said method being a method according to the present invention.

The present invention also concerns the ferric iron obtainable by, preferably obtained by, a process or system as disclosed herein, preferably in the form of ferric chloride, more preferably in an aqueous solution, even more preferably in a concentration of at least 30 wt %, yet more preferably at least 35 wt %, most preferably at least 38 wt % of ferric chloride, e.g. 39, 40, 41, 42, 43, 44, 45, 46, 47, 48, 49, 50 wt % or more.

The present invention further concerns the use of ferric iron as obtainable by, preferably obtained by, a process or system as disclosed in this text, for the purification of water and waste water, for coagulating or flocculating impurities in liquids, such as phosphates in water, for etching in the production of printed circuit boards, in particular for etching cupper of printed circuit boards, for etching in the production of photogravure plates for printing photographic and fine art images in intaglio and rotogravure cylinders used in the printing industry, for catalysing reactions as a Lewis acid, for catalyzing an organic synthesis reaction, in reaction with cyclopentadienylmagnesium bromide for preparing ferrocene, a metal-sandwich complex, in conjunction with NaI in acetonitrile to mildly reduce organic azides to primary amines, for staining blades, as to give a contrasting effect to the metal, for viewing metal layering or imperfections, for etching the widmanstatten pattern in iron meteorites, for treating overcropping of an animal's claws, particularly when the overcropping results in bleeding, for Raku ware firing, the iron coloring a pottery piece shades of pink, brown, and orange, for testing the pitting and crevice corrosion resistance of stainless steels and other alloys,
in an animal thrombosis model, and/or
for pharmaceutical applications, such as for use in a medicament for treating iron deficiency,
whereby preferably the ferric iron is in the form of ferric chloride, more preferably in an aqueous solution of at least 30 wt %, yet more preferably at least 35 wt %, most preferably at least 38 wt % of ferric chloride, e.g. 39, 40, 41, 42, 43, 44, 45, 46, 47, 48, 49, 50 wt % or more.

The present invention also concerns the use of ferric iron as obtainable by, preferably obtained by, a process or system as disclosed in this text:
as a drying reagent,
for pharmaceutical applications, such as for use in a medicament for treating iron deficiency, and/or
as a catalysis agent in an organic synthesis reaction,
whereby preferably said ferric iron is in anhydrous form.

DETAILED DESCRIPTION OF THE INVENTION

Figure 1:
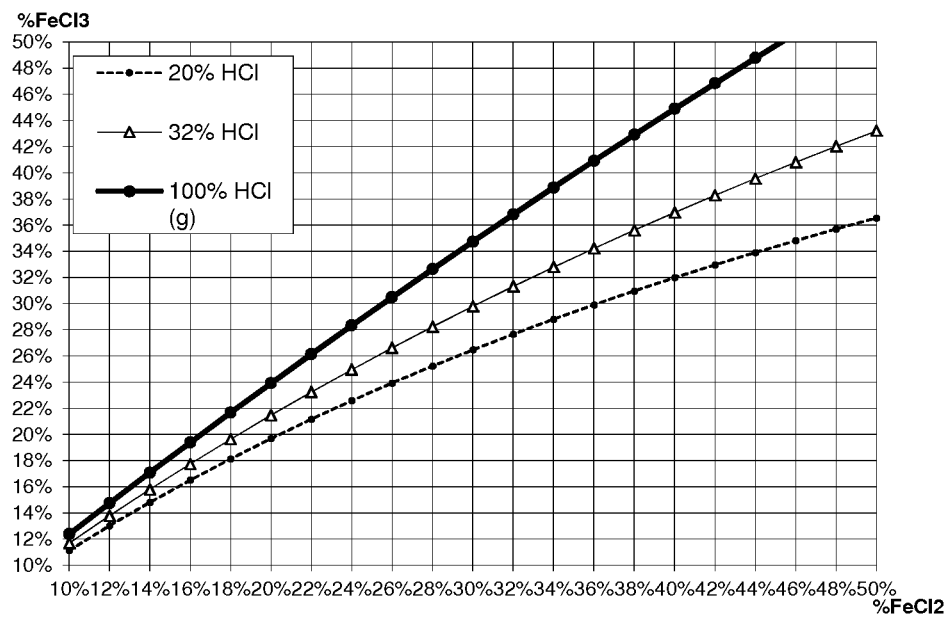
FIG. 1 shows the theoretical concentration of ferric chloride solution obtained by oxychlorination of an aqueous solution of ferrous chloride and hydrochloric acid as a function of the concentration ferrous chloride and for different concentrations of hydrochloric acid.

The present invention concerns a method and a system for oxidizing ferrous iron to ferric iron, in particular for oxidizing ferrous chloride, more in particular ferrous chloride comprised in waste pickling liquor, into ferric chloride.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "% by weight", "weight percent" and "wt %", here and throughout the description unless otherwise defined, refers to the relative weight of the respective component based on the overall weight of the formulation.

The term "mixing system" here and throughout this text refers to a system for mixing a gas into a liquid. The mixing may occur via injection of the gas into the liquid, via a bubbling in e.g. a bubble column, via stirring, etc. The term "injection system" here and throughout this text refers to a system comprising an injector, also customary called ejector or eductor, for mixing gas into a liquid, preferably making use of the Venturi effect.

The term "impact zone" here and throughout this text refers to a zone of increased impact between at least two fluid streams. The impact zone is characterized by high turbulence resulting from the collision of the at least two fluid streams.

The term "colliding" with respect to at least two mixes or two gas-liquid mixture streams, here and throughout this text, refers to the process of bringing together two separate fluids in a turbulent manner, preferably in such a manner that the energy of the turbulences is at least partly used for increasing the total effective reaction surface between the gaseous and the liquid phases in the mixes.

The term "chlorination" here and throughout this text refers to oxidation of an ion with chlorine $Cl_2$.

The term "oxychlorination" here and throughout this text refers to oxidation of an ion in the presence of oxygen $O_2$ and hydrochloric acid HCl.

The term "fluid connection" or "in fluid connection" refers to a connection between at least two components or parts for a gas, liquid or gas-liquid mixture, and which allows a gas, liquid or gas-liquid mixture to stream from one component or part to another.

In an embodiment, one or more extra mixing systems are provided, each of which arranged to mix said gas with said liquid, thereby obtaining one or more extra gas-liquid mixture streams, whereby said first, said second and said one or more extra gas-liquid mixture streams are made to collide in an impact zone.

In a preferred embodiment of the method or system of the present invention, said first mixing system, said second mixing system and/or said one or more mixing systems is an injection system or are injection systems.

An example of an injection system is elaborated in "High Performance Gas-Liquid Reaction Technology" by Rene F. Duveen. Herein, it is argued that the effect of a Jet Mixer in an injection system is not only resulting in a high gas fraction in the vessel in which the mixing is taking place, but is also offering a high mass transfer rate within the Jet Mixer itself (see Table 1).

TABLE 1

Comparison of different gas-liquid reaction contact systems (from "High Performance Gas-Liquid Reaction Technology" by Rene F. Duveen).

| Contact System | Bubble size (mm) | Energy dissipation (W/kg) | Mass transfer coefficient $K_La$ ($s^{-1}$) |
|---|---|---|---|
| Bubble Column | 3-4 | 1 | 0.04-0.06 |
| Stirred Vessel | 2-3 | 3 | 0.1-0.15 |
| Loop Reactor | 1-2 | 5-15 | 0.3-0.45 |

TABLE 1-continued

Comparison of different gas-liquid reaction contact systems (from "High Performance Gas-Liquid Reaction Technology" by Rene F. Duveen).

| Contact System | Bubble size (mm) | Energy dissipation (W/kg) | Mass transfer coefficient $K_L a$ ($s^{-1}$) |
|---|---|---|---|
| Jet Mixer | 0.1-0.4 | 500-3000 | 4-6 |
| Impact Zone | <0.1 | 5000-30000 | 10-15 |

The Jet Mixer is generating very finely dispersed gas bubbles and offers very high local mass transfer rates. The highest energy dissipation takes place in the impact zone of the Jet Mixer, resulting in extremely fine gas bubbles and very high mass transfer coefficients. This fact has led to the idea of the continuous operation of e.g. a Loop Reactor. The conversion of a Nitroaromatic compounds to the corresponding aniline, such as Dinitrotoluene to Toluenediamine, are excellent examples for reactions carried out in continuous Loop Reactors. While maintaining a rather high concentration of active catalyst in the reaction suspension, the nitro-compound is fed continuously into the impact zone of the Jet Mixer. The conversion of the nitro-compound will take place immediately and completely because of the presence of catalyst, hydrogen and the high-energy dissipation in the impact zone. Herein, the reactor contents consist mainly of amine and water. The condenser in the gas circulation system can continuously remove this water. The product, Toluenediamine, is continuously filtered through the cross-flow filter system in the liquid circulation line and taken away from the reactor system. For this particular reaction, the continuous Loop Reactor is competing with a fixed bed reactor, where the reaction is carried out in the gas phase at much higher pressures such as 200 to 300 bar g. In a continuous stirred vessel system, this reaction would require a cascade of 3 stirred vessels. Further, due to the high exothermic reaction it would be necessary to use a solvent in order to dilute the solution and to reduce the heat released.

For the reaction in the present invention, namely the oxidation of a metal ion, such as Fe(II), in a liquid solution, with a gaseous oxidation agent and in the presence of hydrochloric acid in gaseous or liquid phase, the jet mixer is one exemplary type of mixer which can be used in the injection systems of the present invention. An impact zone is created where the output streams of multiple mixing systems such as jet mixers, are made to collide. It is clear from the above example that the presence of an impact zone decreases the bubble size and thereby increases the total gas-liquid interaction surface.

Preferably said first and said second gas-liquid mixture streams are made to collide substantially head-on. In case extra mixing systems are provided, the gas-liquid streams are preferably made to collide in a regular set-up, such as a planar set-up whereby e.g. a number n of gas-liquid streams collide with each other under an angle of 360°/n.

Said first and said second outlets of the system which are arranged in a facing relationship to each other, are arranged preferably in a substantially head-on direction.

Hereby, the total head-on direction corresponds to an angle of 180° between the two streams or the two outlets. With "substantially head-on", deviations from the total head-on are meant which are smaller than 45°, preferably smaller than 30°, even more preferably smaller than 15°, yet more preferably smaller than 10°, e.g. 9°, 8°, 7°, 6°, 5°, 4°, 3°, 2°, 1° or any value there between. Most preferably, the total head-on direction is meant.

Preferably, the oxidizing agent comprises air, pure oxygen, pure chlorine or a mixture thereof such as a gas mixture comprising oxygen and/or chlorine. In a more preferred embodiment, said gas mixture comprises gaseous $O_2$, gaseous $O_2$ and HCl, or gaseous $Cl_2$.

In a preferred embodiment, the method of the present invention is performed in series, preferably whereby resulting liquid solution is re-used in a method according to the present invention. In a preferred embodiment, more than one system according to the present invention are connected in series, preferably whereby the systems are in fluid connection with each other for transferring resulting liquid solution from one system to another.

Preferably, the method of the present invention comprises the step of recuperating at least part of said gaseous $O_2$, said gaseous HCl, said gaseous $Cl_2$ or a mixture thereof. Preferable the system according to the present invention is suitable for, and more preferably arranged for, recuperating at least part of said gaseous $O_2$, said gaseous HCl, said gaseous $Cl_2$ or a mixture thereof. In such a setup, the gas molecules which have not been involved in a reaction can be re-used in the same or in another reactor.

Preferably, said liquid comprises ferrous iron and chlorine.

In an embodiment, said liquid comprises chlorine, preferably hydrochloric acid and/or said liquid comprises ferrous chloride ($FeCl_2$).

In an embodiment, the method comprises the steps of:
adding chlorine to said liquid, preferably before said liquid is mixed with said gas.

In a preferred embodiment, an aqueous solution of hydrochloric acid is added to said liquid.

Preferably, said liquid comprises waste pickling liquor (WPL), such as WPL coming from a process whereby steel or iron is pickled with hydrochloric acid. Therefore, in a preferred embodiment, the method of the present invention comprises the steps of:
pickling metal or alloy such as iron or steel with hydrochloric acid, thereby obtaining waste pickling liquor (WPL), said WPL comprising ferrous iron;
providing said WPL as liquid for further processing according to any method for oxidizing ferrous iron to ferric iron as described in this text.

In a preferred embodiment, said liquid is obtained by adding an iron source such as iron, scrap iron, iron oxide, ferrous oxide, magnetite, hematite, limonite, etc. to a liquid comprising hydrochloric acid such as an aqueous solution of HCl or waste pickling liquor.

In a preferred embodiment, said oxidizing agent is provided in an amount which is equal to or more than the minimal amount of oxidizing agent which is stoichiometrically necessary to oxidize all ferrous iron comprised in said liquid to ferric iron.

In an embodiment, said method is performed in batch mode. Alternatively, in a preferred embodiment, said method is performed in continuous mode, whereby preferably said liquid is provided at a liquid flow rate and said gas is provided at a gas flow rate to at least one of said mixing systems, whereby preferably the gas flow rate is equal to or more than the minimal flow rate of oxidizing agent which is stoichiometrically necessary to oxidize all ferrous iron comprised in said liquid at said liquid flow rate.

In a preferred embodiment, the collided mixes are kept at a pressure and a temperature, whereby said temperature is kept between 60% and 105%, preferably between 65% and 100%, more preferably between 70% and 98%, even more preferably between 75% and 95% of a boiling temperature of said mixes expressed in degrees centigrade and at said pressure, whereby preferably said pressure is higher than 60%, more preferably higher than 70%, even more preferably higher than 80%, yet more preferably higher than 90% of atmospheric pressure and lower than 30 bar, preferably lower than 20 bar, more preferably lower than 15 bar, yet more preferably lower than 12 bar, still more preferably lower than 10 bar, still even more preferably lower than 6 bar.

In an embodiment, the impact zone is in fluid connection with a container for holding a reaction fluid comprising a reaction gas, a reaction liquid and a reaction gas-liquid mixture. In a preferred embodiment, the method comprises at least one and preferably a combination of the following steps:
- extracting gaseous oxygen and/or chlorine, e.g. under the form of $O_2$, $Cl_2$ or HCl, from said reaction fluid in said container, and preferably re-using said extracted gaseous oxygen and/or chlorine as oxidizing agent, e.g. for providing said separate mixes;
- extracting gas, preferably comprising an oxidizing agent such as gaseous oxygen and/or chlorine, from said reaction fluid in said container and preferably re-using said extracted gas, e.g. for providing said separate mixes;
- recirculating at least part of said reaction fluid to an inlet of at least one of said mixing systems;
- heating at least part of said reaction fluid to evaporate water out of said fluid, thereby increasing the concentration of ferric iron, more preferably ferric chloride, in said reaction fluid, preferably said reaction fluid is heated outside of the container;
- extracting a liquid residue from said container,
  - said liquid residue comprising ferric iron, preferably said liquid residue comprising a ferric iron content of at least 11 wt %, preferably at least 12 wt %, more preferably at least 13 wt %; and/or
  - preferably said liquid residue comprising ferric chloride ($FeCl_3$), preferably said liquid residue comprising ferric chloride in a concentration of more than 30 wt %, more preferably more than 35 wt %, even more preferable about or more than 40 wt %.

In a preferred embodiment, said reaction fluid is kept at a temperature near or below a boiling temperature of said fluid. Said boiling temperature may depend on the pressure at which said reaction is kept. Preferably said reaction fluid is kept at or near atmospheric pressure and preferably said temperature is lower than 110° C., more preferably lower than 105° C., even more preferably lower than 100° C., yet more preferably lower than 95° C., and/or said temperature is higher than 40° C., more preferably higher than 50° C., even more preferably higher than 60° C., yet more preferably higher than 70° C., still more preferably higher than 75° C., yet even more preferably higher than 80° C., most preferably said temperature lies between 85° C. and 90° C.

In general, a higher pressure leads to smaller gas bubbles in the mixes, thereby increasing the total reaction surface and thus increasing the reaction rate. However, higher pressures put higher constraints on the apparatus used to implement the process. In particular mechanical stresses are larger at higher pressures, leading to sealing problems. Furthermore, higher pressures usually lead to higher temperatures and increased corrosion rates. The present invention allows operation at strongly reduced pressures compared to prior art techniques. In fact, the present invention allows operation near atmospheric pressure, while still ensuring a large enough reaction rate. Therefore, in a preferred embodiment, said container comprises a gas pressure at atmospheric pressure or near atmospheric pressure, preferably said gas pressure is higher than 80%, more preferably higher than 85%, even more preferably higher than 90% of atmospheric pressure, e.g. 91, 92, 93, 94, 95, 96, 97, 98, 99% of atmospheric pressure, and/or said gas pressure is lower than 20 bar, preferably lower than 16 bar more preferably lower than 13 bar, yet more preferably lower than 10 bar, still more preferably lower than 8 bar, even more preferably lower than 6 bar, e.g. 5, 4, 3, 2 bar or lower. In a particularly preferred embodiment, the gas pressure is lower than 150%, more preferably lower than 140%, even more preferably lower than 130%, yet more preferably lower than 120%, still more preferably lower than 110% of atmospheric pressure, e.g. 109, 108, 107, 106, 105, 104, 103, 102, 101% of atmospheric pressure.

In a particularly preferred embodiment, said container comprises a gas pressure and said reaction fluid is kept at a temperature near or below a boiling temperature of said fluid, whereby said boiling temperature depends on said pressure. Preferably, said temperature is kept between 60% and 105%, preferably between 65% and 100%, more preferably between 70% and 98%, even more preferably between 75% and 95% of a boiling temperature of said mixes expressed in degrees centigrade and at said gas pressure, whereby preferably said gas pressure is higher than 60%, more preferably higher than 70%, even more preferably higher than 80%, yet more preferably higher than 90% of atmospheric pressure and lower than 30 bar, preferably lower than 20 bar, more preferably lower than 15 bar, yet more preferably lower than 12 bar, still more preferably lower than 10 bar, still even more preferably lower than 6 bar.

In a preferred embodiment, the method further comprises the steps of:
- providing at least part of said reaction fluid from said container to an inlet of at least one of said mixing systems.

In a preferred embodiment, the method further comprises the steps of:
- providing at least part of said extracted gaseous oxygen and/or chlorine, e.g. gaseous $O_2$, gaseous $O_2$ and HCl, or gaseous $Cl_2$, to an inlet of at least one of said mixing systems.

The invention is further described by the following non-limiting examples which further illustrate the invention, and are not intended to, nor should they be interpreted to, limit the scope of the invention. In this respect, it should be noted that the present text refers mainly to the process of oxychlorination of ferrous iron in a ferrous chloride solution to ferric chloride, but that similar embodiments and examples hold for e.g. the oxychlorination of ferrous sulphate to ferric chlorosulphate.

EXAMPLES

Example 1

Ferrous iron in ferrous chloride can be oxidized by exposure to chlorine gas, according to the oxychlorination reaction:

$$FeCl_2 + \tfrac{1}{2}Cl_2 \rightarrow FeCl_3 + \text{heat}$$

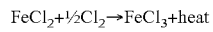

For this reaction, a liquid comprising ferrous chloride can be mixed with chlorine gas using the at least two mixing systems of the present invention, whereby for each 2 molecules of $FeCl_2$, at least one molecule of $Cl_2$ is provided. Preferably a surplus of $Cl_2$ gas is provided.

Example 2

Ferrous iron in ferrous chloride can be oxidized by adding hydrochloric acid to it, and by subsequent exposure to an oxygen-containing gas, according to the oxychlorination reaction:

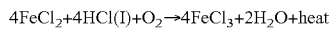

$$4FeCl_2 + 4HCl(l) + O_2 \rightarrow 4FeCl_3 + 2H_2O + heat$$

For this reaction, a liquid comprising ferrous chloride can be mixed with an hydrochloric acid, e.g. in an aqueous solution, and subsequently mixed with pure oxygen gas using the at least two mixing systems of the present invention, whereby for each 4 molecules of $FeCl_2$, at least one molecule of $O_2$ is provided. Preferably a surplus of $O_2$ gas is provided.

The reaction heat available in this example is less than in example 1. However, the reactants may be cheaper, safer to use and/or more readily available than in the first example. An aqueous solution is produced.

If the hydrochloric acid is added in gaseous form to a $FeCl_2$ solution of 30-35 wt %, it is possible to obtain a solution with a concentration of $FeCl_3$ of about 35-40 wt %, i.e. close to the maximal concentration of ferric chloride which is stable at small HCl concentration (less than 2 wt %), and does not lead to precipitation.

For instance, if a ferrous chloride solution of 32 wt % is mixed with a hydrochloric acid solution of 32 wt %, the water after the oxychlorination process originates mainly from the ferrous chloride solution. More in particular, 75% of the water in the resulting ferric chloride solution comes the ferrous chloride solution, compared to 22% coming from the hydrochloric acid solution, and 3% coming from the reaction.

The theoretical concentration of ferric chloride solution obtained by oxychlorination of an aqueous solution of ferrous chloride and hydrochloric acid as a function of the concentration ferrous chloride and for different concentrations of hydrochloric acid is illustrated in FIG. 1. Curves are given for hydrochloric acid concentrations of 20 wt % (small circles, dotted line) and 32 wt % (triangles, full line), and for 100% gaseous HCl (large circles, full line). The figures shows that for WPLs comprising a concentration around 22-23 wt % of $FeCl_2$, which is a typical concentration for many WPLs, at most a 26 wt % solution of $FeCl_3$ can be reached when pure (gaseous) HCl is used as chlorine-comprising reactant. The concentration of $FeCl_3$ drops to 23-24 wt % for a liquid HCl 32 wt % aqueous solution as reactant, and even further down to about 21 wt % for a liquid HCl 20 wt % aqueous solution as reactant. Similar statements hold for other types of WPL comprising a higher content of $FeCl_2$, e.g. a 32 wt % concentration of $FeCl_2$, which leads to a concentration of $FeCl_3$ of about 37 wt %, 31 wt % and 28 wt % for pure HCl, a 32 wt % solution of HCL and a 20 wt % solution of HCl respectively. Commercially attractive solutions of $FeCl_3$ of up to and more than 40 wt % can be made by heating the resulting solution, whereby water can be evaporated.

In another instance, an iron source can be used to obtain the liquid comprising ferrous iron. The iron source may comprise a solid iron source which may, without limitation, include iron, scrap iron, iron ore such as hematite, magnetite, limonite, etc., all industrial formed iron oxides, etc. The method and system of the present invention may be used for oxidizing the ferrous iron present coming from these iron sources. For example, the iron sources may be dissolved using a hydrochloric acid solution to obtain a liquid comprising ferrous chloride, according to e.g. the following reactions:

for e.g. scrap iron: 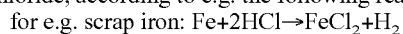 $Fe + 2HCl \rightarrow FeCl_2 + H_2$
for ferrous oxide: 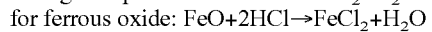 $FeO + 2HCl \rightarrow FeCl_2 + H_2O$
for magnetite:  $Fe_3O_4 + 8HCl \rightarrow FeCl_2 + 2FeCl_3 + 4 H_2O$ The thus obtained liquid may have a high concentration of iron and its water content may be very low. If the resulting liquid is treated with the method or system of the present invention, a liquid with a high concentration of ferric iron can be obtained directly. For instance, if magnetite is used as iron source for obtaining a liquid comprising ferrous and ferric chloride, the resulting liquid after the oxychlorination process of the present invention may have a concentration of ferric chloride of about 37-38 wt % without any further distillation. This concentration can be increased up to 70-80 wt % if scrap iron and/or ferrous oxide is used as iron source. Alternatively, iron sources can be added to waste pickling liquor to increase the iron content of the liquid. The iron-enriched liquid can be treated in a process of the present invention, thereby obtaining liquid comprising a high ferric-iron content, such as a ferric chloride solution of 38 to 40 wt %.

The iron source may comprise a liquid iron source, which may, without limitation, include a ferrous chloride solution, a ferric chloride solution, a solution comprising a mixture of ferrous and ferric chloride, etc. Such liquid iron source may additionally comprise dissolved HCl. By using a concentrated liquid iron source, i.e. a liquid iron source with high iron content and low water content, concentration of the resulting ferric chloride solution up to about 70-80 wt % are achievable.

The rate at which ferrous chloride is oxidized to ferric chloride is considerably faster if an impact zone is used as disclosed in this application, as compared to a process where no impact zone is used. Tests have shown that an increase in rate of about 20% can be obtained in a setup with impact zone and colliding gas-liquid mixture streams.

A small-scale test setup was reproducibly able to convert 90% of the ferrous chloride into ferric chloride within 3.3 hours when using an impact zone, which was about 20% faster than when a setup without impact zone was used.

Figure 2:
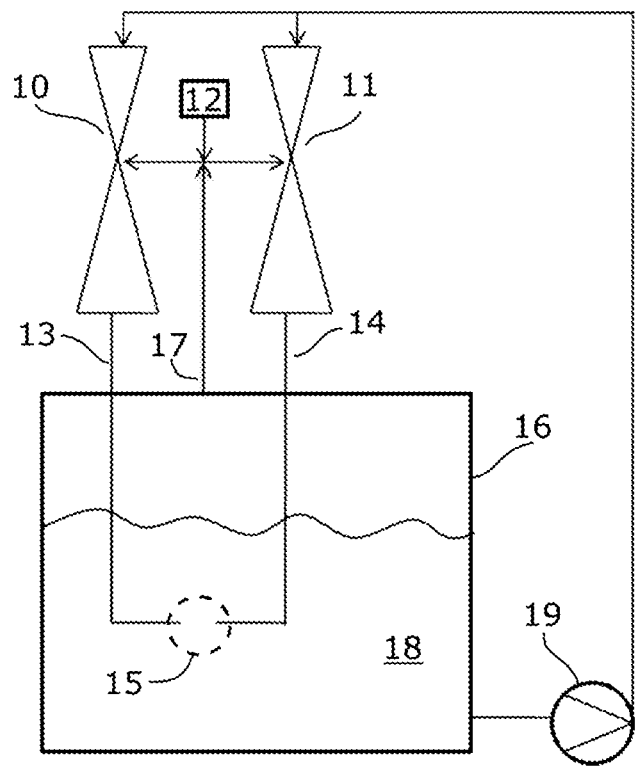
FIGS. 2 and 3 are diagrams which illustrate embodiments of the method and system according to the present invention.
Figure 3:
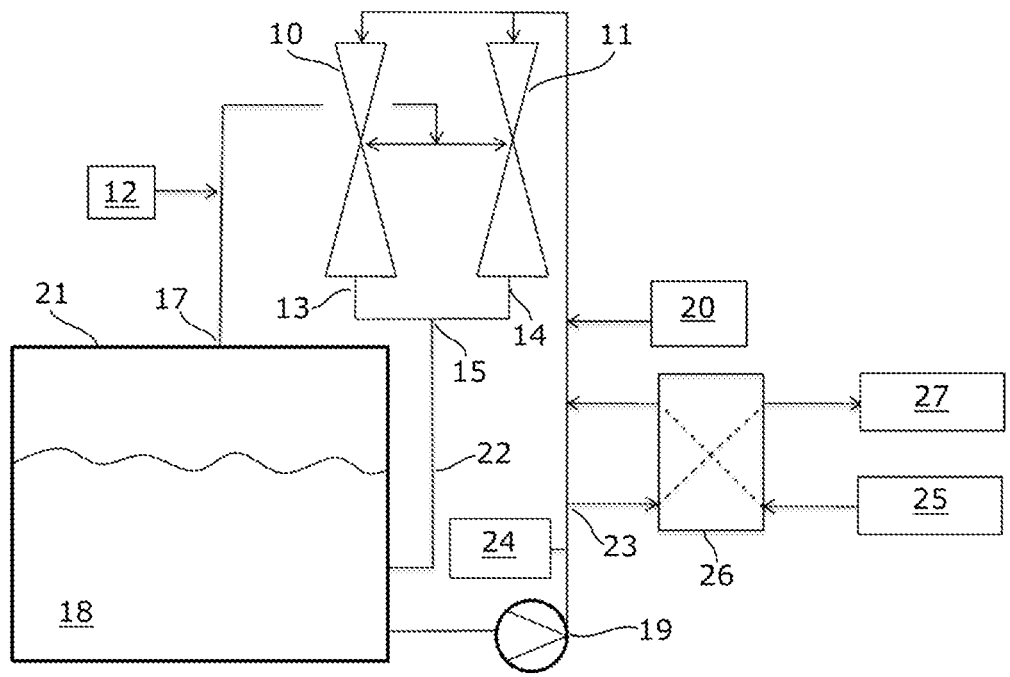

FIGS. 2 and 3 are diagrams which illustrate embodiments of the method and system according to the present invention. FIG. 2 illustrates a method and setup for oxidizing ferrous iron to ferric iron in batch mode, although the method could also be performed in continuous mode. However, since prior art methods are typically batch-mode process, the following numbers refer to the present method operated in batch mode to make a comparison with prior art techniques easier. Hereby, a liquid comprising ferrous iron, e.g. a liquid comprising $FeCl_2$ such as WPL, is being recirculated through to reach e.g. 90% or 95% or more conversion to ferric iron. The liquid is provided to a first injection system (10) and a second injection system (11). The injection systems (10, 11) mix a stoichiometric surplus of gaseous oxidizing agent (12) such as gaseous $O_2$ or gaseous $Cl_2$ with the liquid. The resulting first (13) and second (14) gas-liquid mixture streams are than guided towards an impact zone (15) where they are made to collide head-on. The impact zone (15) in this example is located in a container (16) in which the temperature is kept to within 85 and 90° C. The gas pressure in the container can be kept at atmospheric pressure, i.e. no under- or overpressure needs to be induced in the container. Due to the surplus of oxidizing agent, a certain amount remains present in the reaction fluid in the container. This surplus can be evacuated (17) and reused in the injectors (10, 11). The reaction fluid (18) can be recirculated by a pump (19) to the liquid inlets of the injectors (10, 11).

FIG. 3 illustrates a method and setup for oxidizing ferrous iron to ferric iron in batch mode. As in FIG. 2, the method could also be performed in continuous mode. However, since prior art methods are typically batch-mode process, the following numbers refer to the present method operated in batch mode to make a comparison with prior art techniques easier. Hereby, a liquid comprising ferrous iron, e.g. a liquid comprising $FeCl_2$ such as WPL, is partly being recirculated after the impact zone and partly drained. In this example, the liquid is provided to a first injection system (10) and a second injection system (11). The liquid could be WPL mixed with a liquid HCl solution (20). The injection systems (10, 11) mix a stoichiometric surplus of gaseous oxidizing agent (12), which in this case is preferably $O_2$, with the liquid. The resulting first (13) and second (14) gas-liquid mixture streams are than guided towards an impact zone (15) where they are made to collide head-on. The resulting reaction fluid is then guided (22) towards a container (21). Again the temperature of the container can be kept to a pre-determined value, such as between 85 and 90° C. The gas pressure in the container can be kept at atmospheric pressure, i.e. no under- or overpressure needs to be induced in the container. Due to the surplus of oxidizing agent, a certain amount remains present in the reaction fluid in the container. This surplus can be evacuated (17) and reused in the injectors (10, 11). The reaction fluid (18) can be recirculated by a pump (19) partly to the liquid inlets of the injectors (10, 11) and can be partly drained (23). Before draining (23), the ratio of ferric to ferrous chloride can be measured electrochemically, e.g. by a redox measurement (24). The outcome of the measurement can be used to decide if and how much reaction fluid can be drained and how much new liquid comprising ferrous iron is to be added. During start up, it can be expected that the concentration of ferric iron is too low to start draining liquid residue (27) or to start adding liquid comprising ferrous iron (25). After a while, the concentration of ferric iron can be expected to have increased above a certain pre-determined limit, after which draining may be started. The drained residue (27) can be made to exchange heat with the added new liquid (25) in a heat exchanger (26). As the draining can be arranged continuously, the method and setup illustrated in FIG. 3 leads to a continuous production of ferric iron, e.g. a solution of ferric chloride.

Figure 4:
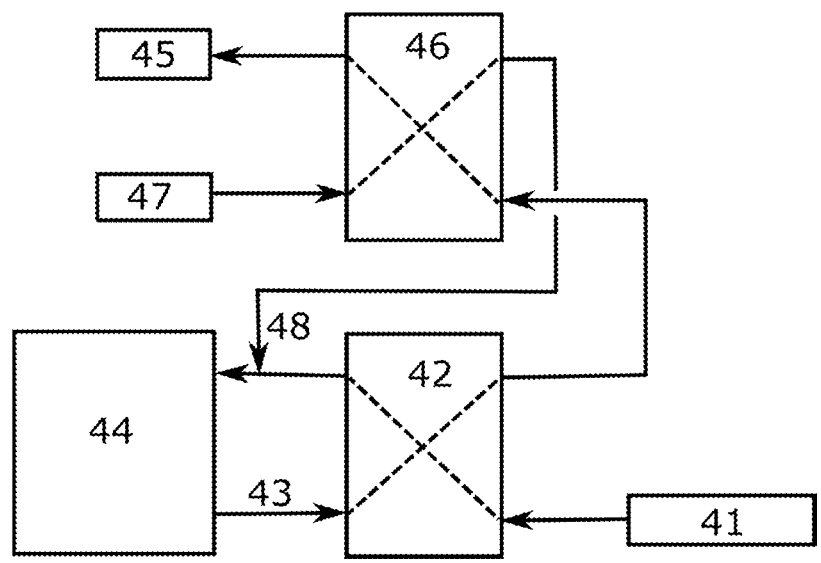
FIG. 4 illustrates an embodiment of the present invention in which heat is exchanged between the solution to be treated, such as WPL, or the HCl-solution on the one hand and the resulting solution of the present invention, such as an aqueous solution comprising ferric chloride on the other hand.

If cooling is necessary, an embodiment of the present invention may be devised wherein this may be done externally or by heat exchange between extracted $FeCl_3$ solution and supplied liquid comprising ferrous chloride and/or HCl. An example of such an embodiment is shown in FIG. 4. Here, the solution to be treated (41), e.g. WPL comprising a mixture of ferric and ferrous chloride, can be heated in a heat-exchanger (42) by the resultant solution (43) which comprises ferric chloride in an aqueous solution (45) and which comes out at increased temperature, e.g. due to the reaction heat, from an oxychlorination reactor (44) according to the present invention. The resultant solution after this first heat exchanger (42) can be still at increased temperature and may be used in a second heat exchanger (46) to heat up a HCl-solution (47) which can subsequently be added (48) to e.g. the heated WPL.

What is claimed is:

1. A method for oxidizing ferrous iron to ferric iron, the method comprising:
   providing a liquid comprising said ferrous iron and a gas comprising an oxidizing agent;
   providing at least two separate mixes, at least a first mix and at least a second mix, wherein each of the first mix and the second mix comprises the liquid and the gas; and
   colliding said separate mixes thereby obtaining the ferric iron.

2. The method according to claim 1, wherein the oxidizing agent comprises oxygen and/or chlorine.

3. The method according to claim 1, whereby said liquid and/or said gas further comprises a neutralizing agent.

4. The method according to claim 3, wherein the neutralizing agent comprises chloride or sulphate in acid form.

5. The method according to claim 1, whereby said oxidizing agent comprises gaseous oxygen $O_2$, pure gaseous oxygen $O_2$, gaseous chlorine $Cl_2$, pure gaseous chlorine $Cl_2$, air, air with gaseous $Cl_2$ and whereby said liquid or said gas comprises hydrochloric acid.

6. The method according to claim 1, whereby said liquid comprises ferrous chloride or ferrous sulphate and whereby the ferrous iron is oxychlorinated to ferric chloride or ferric chloro-sulphate by reaction with said oxidizing agent and/or neutralizing agent, or whereby said liquid comprises ferrous sulfate and whereby the ferrous iron is oxidized to ferric sulfate by reaction with said oxidizing agent and/or neutralizing agent.

7. The method according to claim 1, comprising at least one of the following: pickling metal or alloy with hydrochloric acid, thereby obtaining waste pickling liquor (WPL), said WPL comprising ferrous iron; providing said WPL as liquid for further processing according to a method for oxidizing ferrous iron to ferric iron according to claim 1; and adding an aqueous solution of hydrochloric acid to said liquid before said liquid is mixed with said gas.

8. The method according to claim 7, wherein the metal or alloy comprises iron or steel.

9. The method according to claim 1, whereby said liquid is obtained by adding an iron source to a liquid comprising hydrochloric acid.

10. The method according to claim 9, wherein the iron source is selected from the group consisting of iron, scrap iron, iron oxide, ferrous oxide, magnetite, and hematite limonite.

11. The method according to claim 1, whereby said method is performed in a continuous mode.

12. The method according to claim 1, whereby the collided mixes are kept at a pressure and a temperature, whereby said temperature is kept between 75% and 95% of a boiling temperature of said mixes expressed in degrees centigrade and at said pressure.

13. The method according to claim 12, wherein said pressure is higher than 80% of atmospheric pressure and lower than 10 bar.

14. The method according to claim 1, wherein the first mix is produced in a first mixing system comprising an inlet connected to a supply of a liquid which comprises ferrous iron and an inlet connected to a supply of a gas comprising an oxidizing agent, said first mixing system arranged for mixing the gas with the liquid into a first mix, and said first mixing system comprising a first outlet for said first mix;
   and the second mix is produced in at least a second mixing system comprising an inlet connected to a supply of a liquid which comprises ferrous iron and an inlet connected to a supply of a gas comprising an oxidizing agent, said second mixing system arranged for mixing the gas with the liquid into a second mix, and said second mixing system comprising a second outlet for said second mix;
   whereby the first outlet and said second outlet are in fluid connection with an impact zone and the first and the second outlets are arranged in a facing relationship to each other;
   whereby the impact zone is in fluid connection with a container for holding a reaction fluid comprising a reaction gas, a reaction liquid and/or a reaction gas-liquid mixture,
   whereby the container comprises: a gas outlet for evacuating at least part of the reaction gas from the container, the gas outlet in fluid connection with at least one of said mixing systems for supplying the first and/or second mixing system with the gas comprising an oxidizing agent; and/or a liquid outlet for extracting the reaction liquid and/or a reaction gas-liquid mixture from the container, the liquid outlet in fluid connection with at least one of said mixing systems for supplying the first and/or second mixing system with the liquid comprising ferrous iron and/or with a gas-liquid mixture comprising ferrous iron.

15. The method according to claim 14, wherein the oxidizing agent comprises oxygen and/or chlorine.

16. The method according to claim 14, wherein the reaction gas comprises oxygen and/or chlorine.

17. The method according to claim 16, wherein the reaction gas comprises $O_2$, $Cl_2$ or HCl.

18. The method according to claim 14, wherein the liquid and/or the gas comprises chloride or sulphate in acid form.

19. The method according to claim 14, wherein the liquid and/or the gas comprises chloride or sulphate in acid form.

20. The method according to claim 14, wherein said first mixing system, said second mixing system and/or said one or more mixing systems is an injection system.

21. The method according to claim 14, wherein the method is carried out in a closed system.

\* \* \* \* \*